(12) United States Patent
Sharma et al.

(10) Patent No.: US 12,248,228 B2
(45) Date of Patent: Mar. 11, 2025

(54) DIRECTING PROJECTED IMAGES FOR A VEHICLE

(71) Applicant: GM Global Technology Operations LLC, Detroit, MI (US)

(72) Inventors: Manoj Sharma, Troy, MI (US); Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 18/298,600

(22) Filed: Apr. 11, 2023

(65) Prior Publication Data

US 2024/0345449 A1 Oct. 17, 2024

(51) Int. Cl.
*G02F 1/29* (2006.01)
*B60K 35/00* (2024.01)
*G02B 27/01* (2006.01)

(52) U.S. Cl.
CPC .............. *G02F 1/294* (2021.01); *B60K 35/00* (2013.01); *G02B 27/0101* (2013.01); *B60K 2360/334* (2024.01); *G02B 2027/0123* (2013.01); *G02F 2201/305* (2013.01); *G02F 2203/12* (2013.01)

(58) Field of Classification Search
None
See application file for complete search history.

(56) References Cited

U.S. PATENT DOCUMENTS

| | | | |
|---|---|---|---|
| 6,639,733 | B2 | 10/2003 | Minano et al. |
| 7,286,296 | B2 | 10/2007 | Chaves et al. |
| 2005/0086032 | A1 | 4/2005 | Benitez et al. |
| 2005/0243570 | A1 | 11/2005 | Chaves et al. |
| 2010/0253918 | A1 | 10/2010 | Seder et al. |

(Continued)

FOREIGN PATENT DOCUMENTS

| | | |
|---|---|---|
| DE | 102017004859 A1 | 3/2019 |
| WO | 2013088510 A1 | 6/2013 |

OTHER PUBLICATIONS

Dross, et al. "Non-imaging optics combine LEDs into one bright source," SPIE, Jun. 27, 2006, https://spie.org/news/0197-non-imaging-optics-combine-leds-into-one-bright-source?SSO=1.

(Continued)

*Primary Examiner* — Ifedayo B Iluyomade
(74) *Attorney, Agent, or Firm* — Vivacqua Crane, PLLC

(57) ABSTRACT

A system for directing projections within a vehicle includes a projector for producing a projected image. The system also includes a projection directing module in optical communication with the projector for directing the projected image to a predetermined location. The system also includes a projection surface upon which the projected image is projected. The system also includes a controller in electrical communication with the projector and the projection directing module. The controller is programmed to configure the projection directing module to direct the projected image to a projection region of the projection surface. The controller is further programmed to project the projected image on the projection region using the projector and the projection directing module.

20 Claims, 4 Drawing Sheets

(56) References Cited

U.S. PATENT DOCUMENTS

| | | | |
|---|---|---|---|
| 2014/0152926 A1* | 6/2014 | Takahashi | G02B 27/0093 349/15 |
| 2015/0321606 A1 | 11/2015 | Vartanian et al. | |
| 2017/0212633 A1 | 7/2017 | You et al. | |
| 2020/0254877 A1 | 8/2020 | Nakajima et al. | |
| 2021/0191132 A1* | 6/2021 | Karner | B60K 35/28 |
| 2021/0360211 A1* | 11/2021 | Kawamura | B60K 35/425 |
| 2021/0373330 A1* | 12/2021 | Urey | G02B 25/001 |
| 2023/0135641 A1 | 5/2023 | Miyake et al. | |

OTHER PUBLICATIONS

U.S. Appl. No. 17/749,464, filed May 20, 2022.

* cited by examiner

DIRECTING PROJECTED IMAGES FOR A VEHICLE

INTRODUCTION

The present disclosure relates to systems and methods for displaying graphics in a vehicle, and more particularly, to systems and methods for directing graphics within a vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant. To control and/or illuminate the HUD, a graphics projector may be used to project graphics upon a projection surface (e.g., a windscreen) of the vehicle. However, current display systems may utilize narrow-throw projectors, providing limited coverage of the windscreen. While wide-throw projectors may be available, light intensity is inversely related with throw angle, resulting in a decrease in projection luminance and thus projection fidelity and brightness.

Thus, while current systems and methods for displaying graphics achieve their intended purpose, there is a need for a new and improved system for directing projections within a vehicle.

SUMMARY

According to several aspects, a system for directing projections within a vehicle is provided. The system includes a projector for producing a projected image. The system also includes a projection directing module in optical communication with the projector for directing the projected image to a predetermined location. The system also includes a projection surface upon which the projected image is projected. The system also includes a controller in electrical communication with the projector and the projection directing module. The controller is programmed to configure the projection directing module to direct the projected image to a projection region of the projection surface. The controller is further programmed to project the projected image on the projection region using the projector and the projection directing module.

In another aspect of the present disclosure, the projection directing module further may include a liquid crystal lens (LCL) in optical communication with the projector and a spatial light modulator (SLM). The SLM is in optical communication with the liquid crystal lens and the projection surface. The SLM is in electrical communication with the controller.

In another aspect of the present disclosure, to configure the projection directing module to direct the projected image, the controller is further programmed to set a focal length of the LCL based at least in part on a location of the projection region. The focal length of the LCL is set using a first electrical signal from the controller. To configure the projection directing module to direct the projected image, the controller is further programmed to apply a grating to the SLM based at least in part on the location of the projection region. The grating is applied using a second electrical signal from the controller.

In another aspect of the present disclosure, to set the focal length of the LCL, the controller is further programmed to retrieve an LCL voltage level from an LCL lookup table based at least in part on the location of the projection region. To set the focal length of the LCL, the controller is further programmed to apply the LCL voltage level to the LCL to set the focal length of the LCL using the first electrical signal from the controller.

In another aspect of the present disclosure, The LCL lookup table includes a plurality of LCL voltage levels. Each of the plurality of LCL voltage levels in the LCL lookup table corresponds to a distance between the LCL and the projection region.

In another aspect of the present disclosure, to apply the grating to the SLM, the controller is further programmed to retrieve the grating from a grating lookup table based at least in part on the location of the projection region. To apply the grating to the SLM, the controller is further programmed to apply the grating to the SLM using the second electrical signal from the controller.

In another aspect of the present disclosure, the grating lookup table includes a plurality of gratings. Each of the plurality of gratings in the grating lookup table corresponds to an angle between the SLM and the projection region.

In another aspect of the present disclosure, the projection surface is a vehicle windscreen and the projector is a digital light processing (DLP) projector.

In another aspect of the present disclosure, the vehicle windscreen includes a plurality of projection regions. The controller is further programmed to configure the projection directing module to direct the projected image to each of the plurality of projection regions of the vehicle windscreen. The controller is further programmed to project one of a plurality of projected images on each of the plurality of projection regions using the projector and the projection directing module.

In another aspect of the present disclosure, the projected image includes a primary instrument display to provide information to an occupant of the vehicle.

According to several aspects, a method for directing projections within a vehicle is provided. The method includes configuring a projection directing module to direct a projected image to one of a plurality of projection regions on a vehicle windscreen. The method also includes projecting an image on the one of the plurality of projection regions using a projector and the projection directing module.

In another aspect of the present disclosure, configuring the projection directing module to direct the projected image further may include the projection directing module further including a liquid crystal lens (LCL) in optical communication with the projector and a spatial light modulator (SLM). The SLM is in optical communication with the liquid crystal lens and the vehicle windscreen. The SLM is in electrical communication with a controller.

In another aspect of the present disclosure, configuring the projection directing module to direct the projected image further may include setting a focal length of the LCL based at least in part on a location of the one of the plurality of projection regions. The focal length of the LCL is set using a first electrical signal from the controller. Configuring the projection directing module to direct the projected image further may include applying a grating to the SLM based at least in part on the location of the one of the plurality of projection regions. The grating is applied using a second electrical signal from the controller.

In another aspect of the present disclosure, setting the focal length of the LCL further may include retrieving an LCL voltage level from an LCL lookup table based at least in part on the location of the one of the plurality of projection regions. The LCL lookup table includes a plurality of LCL voltage levels. Each of the plurality of LCL voltage levels in the LCL lookup table corresponds to a distance between the LCL and the one of the plurality of projection regions. Setting the focal length of the LCL further may include applying the LCL voltage level to the LCL to set the focal length of the LCL using the first electrical signal from the controller.

In another aspect of the present disclosure, applying the grating to the SLM further may include retrieving the grating from a grating lookup table based at least in part on the location of the one of the plurality of projection regions. The grating lookup table includes a plurality of gratings. Each of the plurality of gratings in the grating lookup table corresponds to an angle between the SLM and the one of the plurality of projection regions. Applying the grating to the SLM further may include applying the grating to the SLM using the second electrical signal from the controller.

In another aspect of the present disclosure, the method further includes configuring the projection directing module to direct the projected image to each of the plurality of projection regions of the vehicle windscreen. The method further includes projecting one of a plurality of images on each of the plurality of projection regions using the projector and the projection directing module.

In another aspect of the present disclosure, projecting the image on the one of the plurality of projection regions further comprises the projector comprising a digital light processing (DLP) projector.

According to several aspects, a system for directing projections within a vehicle is provided. The system also includes a digital light processing (DLP) projector for producing a projected image. The system also includes a projection directing module in optical communication with the projector. The projection directing module includes a liquid crystal lens (LCL) in optical communication with the DLP projector. The projection directing module also includes a spatial light modulator (SLM). The SLM is in optical communication with the liquid crystal lens. The system also includes a projection surface upon which the projected image is projected and a controller in electrical communication with the DLP projector and the LCL and SLM of the projection directing module. The controller is programmed to determine a selected projection region of a plurality of projection regions of a vehicle windscreen. The controller is also programmed to set a focal length of the LCL based at least in part on a distance between the LCL and the selected projection region. The controller is also programmed to apply a grating to the SLM based at least in part on an angle between the SLM and the selected projection region. The controller is also programmed to project the projected image on the projection region using the projector and the projection directing module.

In another aspect of the present disclosure, the controller is further programmed to sequentially select each of the plurality of projection regions of the vehicle windscreen such that an occupant of the vehicle perceives an image occupying an entirety of the vehicle windscreen.

In another aspect of the present disclosure, the projected image includes a primary instrument display to provide information to the occupant of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

For the purpose of displaying graphics (e.g., for head-up display systems), vehicles may be equipped with display systems including graphics projectors. However, for the purpose of exciting transparent phosphors embedded in a transparent windscreen display (TWD), high-intensity and thus narrow-throw graphics projectors may be required. Narrow-throw projectors may be unable to project an image across the entirety of the vehicle windscreen. Accordingly, the present disclosure provides a new and improved system and method which allows projections from a narrow-throw projector to be directed across the entirety of the vehicle windscreen.

Figure 1:
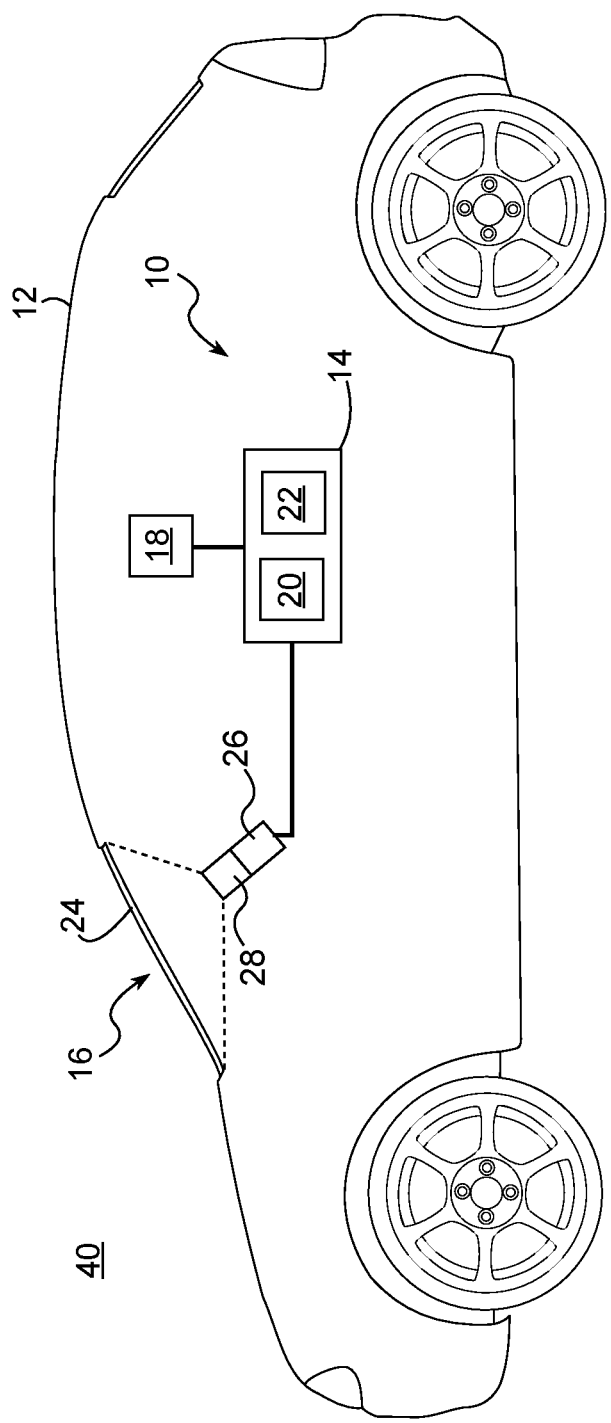
FIG. 1 is a schematic diagram of a system for directing projections within a vehicle, according to an exemplary embodiment.

Referring to FIG. 1, a system for directing projections within a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a transparent windscreen display (TWD) system 16, and vehicle sensors 18.

The controller 14 is used to implement a method 100 for directing projections within a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the TWD system 16 and the vehicle sensors 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

Figure 2:
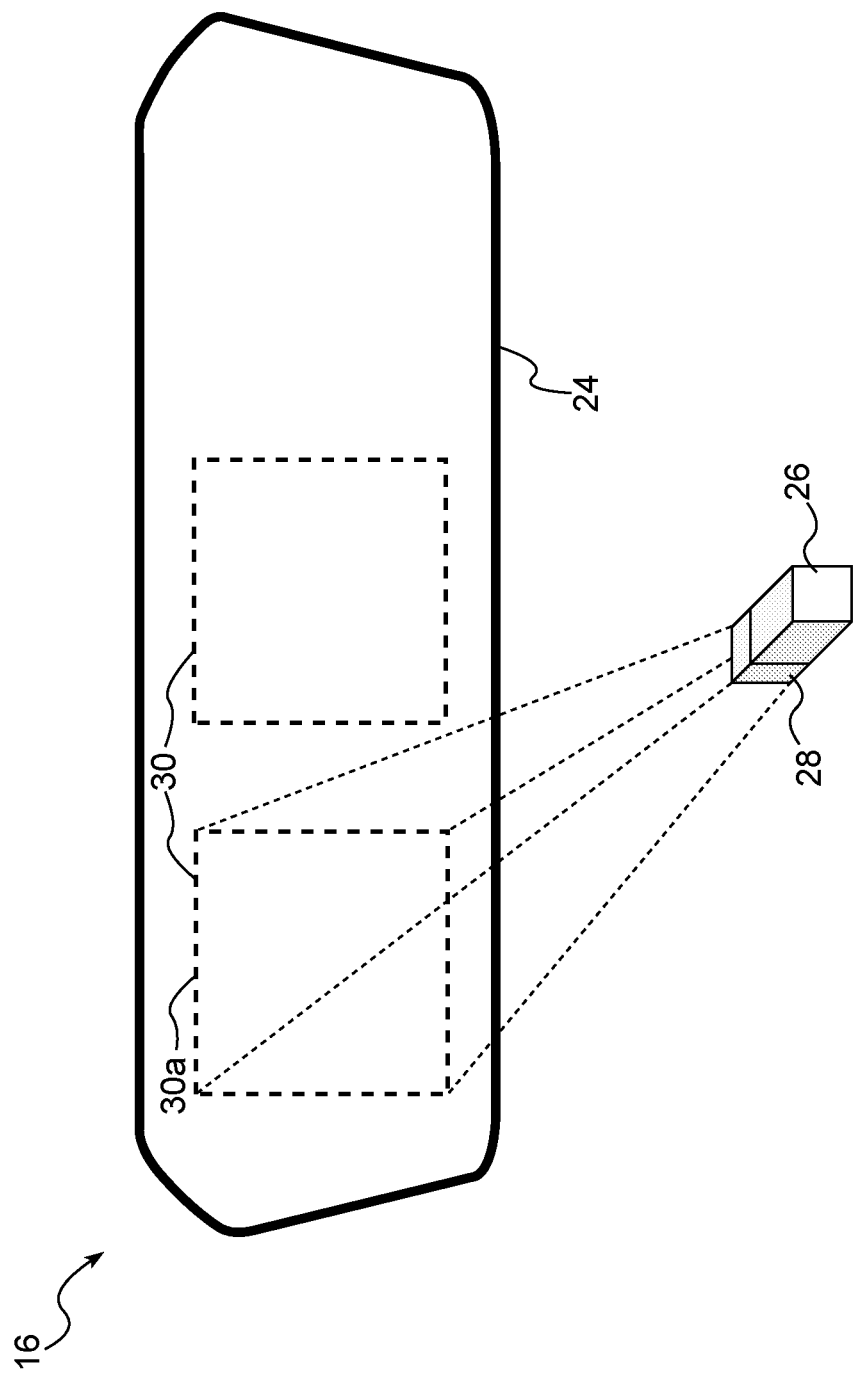
FIG. 2 is a schematic diagram of a transparent windscreen display (TWD) system, according to an exemplary embodiment.

Referring to FIG. 2, a schematic diagram of the TWD system 16 is shown. The TWD system 16 is a type of head-up display (HUD) system used to display images on a vehicle windscreen 24 of the vehicle 12. In an exemplary embodiment, the TWD system 16 includes transparent phosphors (not shown) embedded into the vehicle windscreen 24, a vehicle TWD projector 26, and a projection directing module 28. The TWD system 16 is in electrical communication with the controller 14 as discussed above.

The transparent phosphors are light emitting particles which fluoresce in response to being excited by the vehicle TWD projector 26. In an exemplary embodiment, the transparent phosphors are red, green, and blue (RGB) phosphors, allowing full color operation of the TWD system 16. The use of monochrome and/or two-color phosphors is also within the scope of the present disclosure. When excitation light is absorbed by the transparent phosphors, visible light is emitted by the transparent phosphors. The excitation light is provided by the vehicle TWD projector 26.

The vehicle TWD projector 26 is used to produce a projected image which excites the transparent phosphors in a predetermined pattern to produce images on the vehicle windscreen 24. In an exemplary embodiment, the vehicle TWD projector 26 digital light processing (DLP) projector. A DLP projector is an optoelectronic device which utilizes a digital micromirror device (DMD) to direct light to project images. In a non-limiting example, the DMD contains a grid of mirrors which may be individually tilted to reflect light in a desired direction. The DMD is used to reflect excitation light from a light source (e.g., a projector lamp) onto a projection surface (i.e., the vehicle windscreen 24), to excite the transparent phosphors and create an image. The image is created by rapidly modulating the mirrors to selectively excite transparent phosphors in the vehicle windscreen 24. In the exemplary embodiment of the present disclosure, the projection surface is the vehicle windscreen 24. However, it should be understood that the projection surface may include any surface upon which the projected image may be projected (e.g., a dashboard, a headliner, and/or the like). The vehicle TWD projector 26 is configured to selectively excite the red, green, or blue transparent phosphors of the vehicle windscreen 24.

The vehicle TWD projector 26 may have a limited field-of-projection. In the scope of the present disclosure, the field-of-projection defines an area upon which the vehicle TWD projector 26 is capable of projection with a desired light intensity (i.e., luminance). In a non-limiting example, the field-of-projection is defined by a pixel width and a pixel height (e.g., 1920×1920 pixels). Because the field-of-projection is limited, the vehicle TWD projector 26 may be unable to simultaneously illuminate transparent phosphors distributed throughout the entire vehicle windscreen 24 (i.e., the projection surface). Therefore, the vehicle windscreen 24 is divided into a plurality of projection regions 30. The projection directing module 28 is used to direct the projected image produced by the vehicle TWD projector 26 to one of the plurality of projection regions 30, as will be discussed in greater detail below. While two projection regions 30 are shown, it should be understood that any number of projection regions 30 may be used without departing from the scope of the present disclosure.

Figure 3:
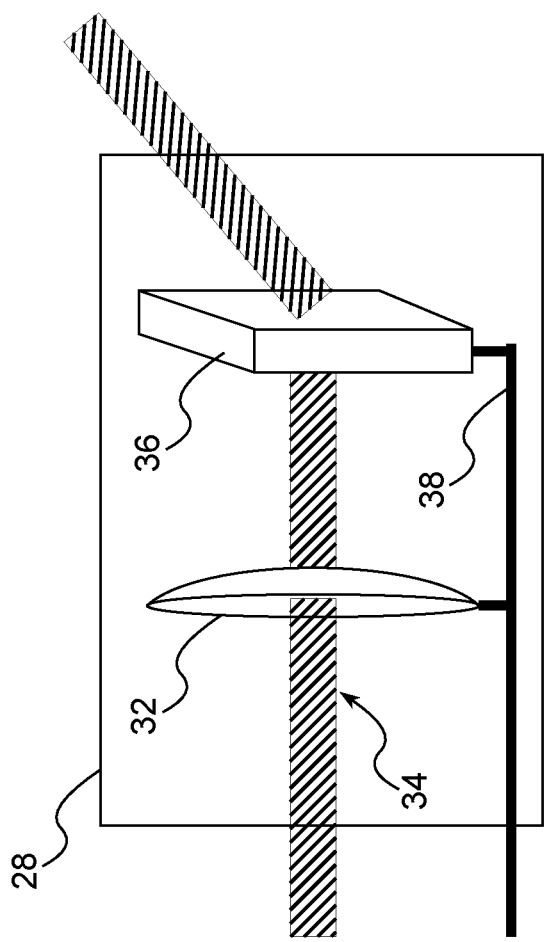
FIG. 3 is a schematic diagram of a projection directing module, according to an exemplary embodiment.

Referring to FIG. 3, a schematic diagram of the projection directing module 28 is shown. The projection directing module 28 includes a liquid crystal lens (LCL) 32 in optical communication with the vehicle TWD projector 26. Therefore, the projected image (i.e., light from the vehicle TWD projector 26) is incident upon the LCL 32, as indicated by reference number 34. The projection directing module 28 further includes a spatial light modulator (SLM) 36 in optical communication with the LCL 32 and the projection surface (i.e., the vehicle windscreen 24). Both the LCL 32 and the SLM 36 are in electrical communication with the controller 14 as indicated by an electrical bus line 38 and discussed above.

The LCL 32 is used to focus the projected image from the vehicle TWD projector 26 such that the image produced by the excitation of the transparent phosphors appears sharp. In an exemplary embodiment, the LCL 32 is a type of optoelectronic device that can vary its focal length in response to an electrical signal. In a non-limiting example, the LCL 32 utilizes a container of optical fluid and a surrounding polymer membrane to create a lens with an electrically controllable focal length. The LCL 32 further includes a current-driven actuator which applies pressure to the membrane, altering a curvature of the LCL 32 and changing the focal length of the LCL 32. The controller 14 controls the focal length of the LCL 32 by applying a voltage across the LCL 32 using the electrical bus line 38, as will be discussed in greater detail below.

The SLM 36 is used to diffract light from the vehicle TWD projector 26 such that the projected image is projected on one of the projection regions 30 of the vehicle windscreen 24, as will be discussed in greater detail below. In an exemplary embodiment, the SLM 36 is an optoelectronic device which is used to display gratings. In the scope of the present disclosure, a grating is a series of lines or ridges formed into a surface which are configured to diffract light into specific patterns. In the SLM 36, a grid of pixels is used to create a pattern of ridges which corresponds to a desired grating. In a non-limiting example, the SLM 36 consists of a layer of liquid crystal material disposed between two glass plates. When an electrical current is applied to the liquid crystal material, an orientation of molecules of the liquid crystal material changes, creating the pattern of ridges which corresponds to the desired grating. The controller 14 controls the grating of the SLM 36 by sending electrical signals using the electrical bus line 38, as will be discussed in greater detail below. It should be understood that various additional optoelectrical devices configured to direct and/or diffract light, such as, for example, digital micromirror devices, microelectromechanical system mirror arrays, galvo mirrors, and/or the like are within the scope of the present disclosure.

Referring again to FIG. 1, in an exemplary embodiment, the controller 14 uses the TWD system 16 to display images indicating conditions of the vehicle 12 and/or an environment 40 surrounding the vehicle 12 detected by the vehicle sensors 18. In a non-limiting example, the TWD system 16 is used as a primary instrument display. In the scope of the present disclosure, a primary instrument display is an instrument which is configured to display information vital to the driving task, such as, for example, vehicle speed, coolant temperature, fuel level, state of charge, and/or the like. In another non-limiting example, the controller 14 uses the TWD system 16 to highlight an object of interest in the environment 40 surrounding the vehicle 12, for example, a hazardous object in a path of the vehicle 12. Using the vehicle sensors 18, the controller 14 identifies an object of interest and determines a position of the object of interest relative to the vehicle 12. Subsequently, the controller 14 uses the TWD system 16 to display an image which appears, from a perspective of a vehicle occupant, to be overlayed on the object of interest based at least on the position of the object of interest relative to the vehicle 12. In an exemplary embodiment, an image is displayed in each of the plurality of projection regions 30, as will be discussed in greater detail below in reference to the method 100. Use of the TWD system 16 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The vehicle sensors 18 are used to determine information about the environment 40 surrounding the vehicle 12. In an exemplary embodiment, the vehicle sensors 18 include at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of vehicle sensors further includes sensors to determine information about the environment 40 surrounding the vehicle 12, for example, an ambient air temperature sensor, a barometric pressure sensor, and/or a photo and/or video camera which is positioned to view the environment 40 in front of the vehicle 12. In another exemplary embodiment, at least one of the vehicle sensors 18 is capable of measuring distances in the environment 40 surrounding the vehicle 12. In a non-limiting example wherein the vehicle sensors 18 include a camera, the vehicle sensors 18 measure distances using an image processing algorithm configured to process images from the camera and determine distances between objects. In another non-limiting example, the vehicle sensors 18 include a stereoscopic camera having distance measurement capabilities. In one example, at least one of the vehicle sensors 18 is affixed inside of the vehicle 12, for example, in a headliner of the vehicle 12, having a view through a vehicle windscreen 24. In another example, at least one of the vehicle sensors 18 is affixed outside of the vehicle 12, for example, on a roof of the vehicle 12, having a view of the environment 40 surrounding the vehicle 12. It should be understood that various additional types of vehicle sensors, such as, for example, LiDAR sensors, ultrasonic ranging sensors, radar sensors, and/or time-of-flight sensors are within the scope of the present disclosure. The vehicle sensors 18 are in electrical communication with the controller 14 as discussed in greater detail above.

Figure 4:
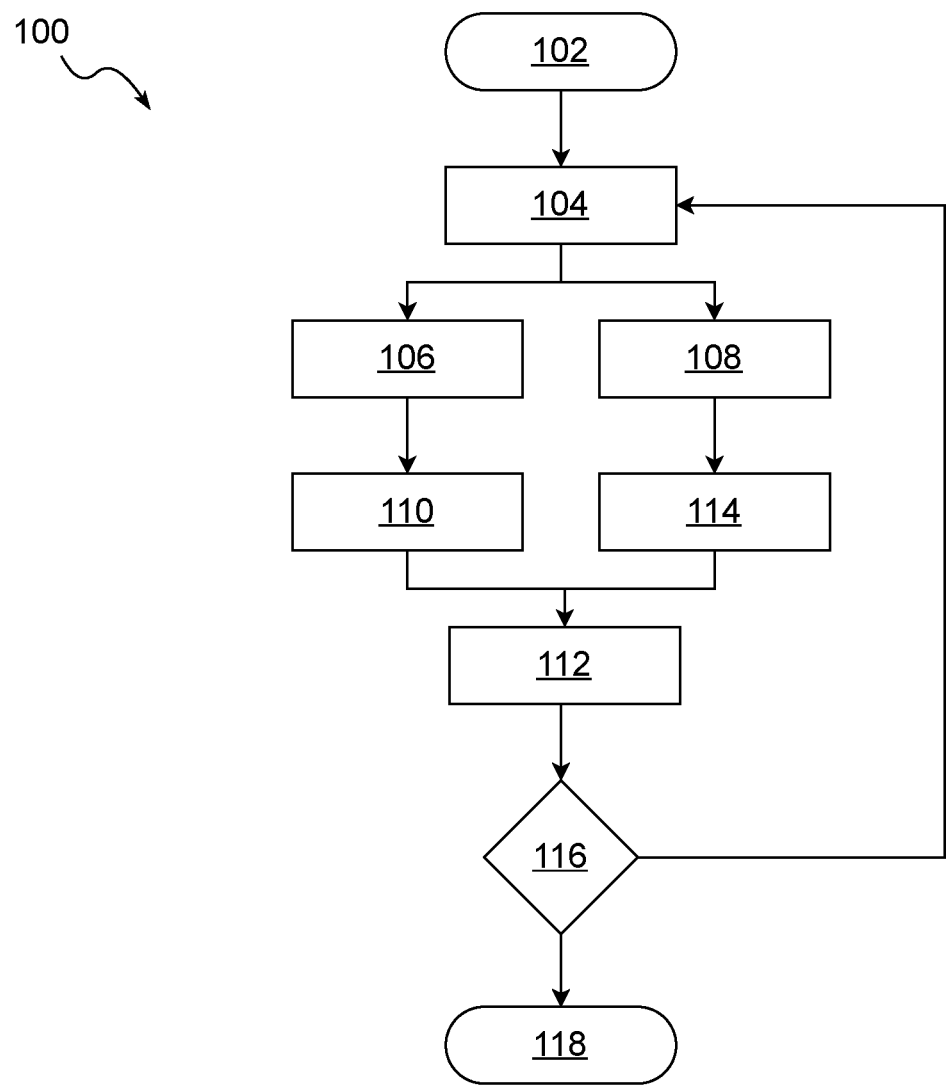
FIG. 4 is a flowchart of a method for directing projections within a vehicle, according to an exemplary embodiment.

Referring to FIG. 4, a flowchart of the method 100 for directing projections within a vehicle is provided. The method 100 begins at block 102 and proceeds to block 104. At block 104, the controller 14 determines a selected projection region 30a of the plurality of projection regions 30 of the vehicle windscreen 24. In an exemplary embodiment, the selected projection region 30a is a left-most one of the projection regions 30 which has not yet been selected. In another exemplary embodiment, the selected projection region is determined based on the position of the object of interest relative to the vehicle 12, as discussed above. After block 104, the method 100 proceeds to blocks 106 and 108.

At block 106, the controller 14 retrieves an LCL voltage level from the media 22 of the controller 14. The required focal length of the LCL 32 in order to produce a sharp image depends on a distance between the LCL 32 and the selected projection region 30a. In an exemplary embodiment, the media 22 of the controller 14 contains an LCL lookup table (LUT) which maps the selected projection region 30a to the LCL voltage level used to set the focal length of the LCL 32. The LCL LUT has one key column (i.e., one key column identifying the selected projection region) and one value column (i.e., one value column for the LCL voltage level). In an exemplary embodiment, the LCL LUT includes a plurality of rows, each of the plurality of rows mapping one of the plurality of projection regions 30 in the key column to an LCL voltage level in the value column. In an exemplary embodiment, the plurality of rows of the LCL LUT are predetermined. In another exemplary embodiment, the plurality of rows of the LCL LUT may be modified by the occupant or a service technician, using, for example, a human-interface device. In yet another exemplary embodiment, the plurality of rows of the LCL LUT may be updated over-the-air (OTA) using a vehicle communication system. It should be understood that any method (e.g., programmatic data structure, logic equation, mathematical function, and/or the like) of mapping a key (i.e., the selected projection region 30a) to a value (i.e., the LCL voltage level) is within the scope of the present disclosure. After block 106, the method 100 proceeds to block 110.

At block 110, the controller 14 applies a first electrical signal to the LCL 32 in order to set the focal length of the LCL 32. In the scope of the present disclosure, the first electrical signal is the LCL voltage level determined at block 106. As discussed above, application of the LCL voltage to the LCL 32 results in pressure on the membrane of the LCL 32, altering the curvature of the LCL 32 and changing the focal length of the LCL 32 such that the image produced by the excitation of the transparent phosphors appears sharp. After block 110, the method 100 proceeds to block 112.

At block 108, the controller 14 retrieves a grating from the media 22 of the controller 14. The required grating of the SLM 36 in order to direct the projected image to the selected projection region 30a depends on an angle between the SLM 36 and the selected projection region 30a. In an exemplary embodiment, the media 22 of the controller 14 contains a grating lookup table (LUT) which maps the selected projection region 30a to the grating applied to the SLM 36 to direct the projected image to the selected projection region 30a. The grating LUT has one key column (i.e., one key column identifying the selected projection region) and one value column (i.e., one value column for the grating). In an exemplary embodiment, the grating LUT includes a plurality of rows, each of the plurality of rows mapping one of the plurality of projection regions 30 in the key column to an grating in the value column. In an exemplary embodiment, the plurality of rows of the grating LUT are predetermined. In another exemplary embodiment, the plurality of rows of the grating LUT may be modified by the occupant or a service technician, using, for example, a human-interface device. In yet another exemplary embodiment, the plurality of rows of the grating LUT may be updated over-the-air (OTA) using a vehicle communication system. It should be understood that any method (e.g., programmatic data structure, logic equation, mathematical function, and/or the like) of mapping a key (i.e., the selected projection region 30a) to a value (i.e., the grating) is within the scope of the present disclosure.

In an exemplary embodiment, the grating is a blazed grating (also known as an echelette grating). In the scope of the present disclosure, a blazed grating is a grating which is optimized to diffract a majority of incident light into a particular diffraction order (i.e., a particular diffraction angle). Therefore, blazed gratings may be used to increase efficiency of redirection of the projected image by the SLM 36. In a non-limiting example, the grating includes a plurality of parallel ridges spaced at a predetermined grating period. By adjusting the grating period, and thus the spacing of the parallel ridges, the diffraction angle of the light diffracted by the SLM 36 is adjusted, allowing the projected image to be directed to the selected projection region 30a. After block 108, the method 100 proceeds to block 114.

At block 114, the controller 14 applies a second electrical signal to the SLM 36 to apply the grating determined at block 108. In an exemplary embodiment, the second electrical signal includes one or more digital communications between the controller 14 and an integrated circuit of the SLM 36 using, for example, a communication protocol (e.g., 12C). In another exemplary embodiment, the second electrical signal includes one or more analog signals generated by the controller 14 which directly control individual pixels of the SLM 36. It should be understood that various additional methods for electrically communicating with and applying the grating determined at block 108 to the SLM 36 are within the scope of the present disclosure.

In an exemplary embodiment, different wavelengths of light (i.e., different colors of light) are diffracted at different angles by the same grating. Therefore, in a non-limiting example, to direct light of different wavelengths to a same location, each of a plurality of projected images is sequentially shown, each of the plurality of projected images containing one wavelength of light. For each of the plurality of projected images shown, a different grating is applied to the SLM 36 such that a desired diffraction angle is achieved for each of the plurality of projected images. By showing the plurality of projected images sequentially at a high frequency, the occupant perceives a full-color image due to persistence of vison. In another non-limiting example, a compensation algorithm may be applied to the grating to align diffraction angles of multiple different wavelengths of light. After block 114, the method 100 proceeds to block 112.

At block 112, the controller 14 uses the vehicle TWD projector 26 and the projection directing module 28 to project the projected image on the selected projection region 30a determined at block 104. The projected image is produced by the vehicle TWD projector 26 and is incident upon the projection directing module 28. The LCL 32 of the projection directing module 28 focuses the projected image, as discussed above, and the focused projected image is incident upon the SLM 36. The SLM 36 directs the focused projected image to the selected projection region 30a as discussed above. The focused and directed projected image is incident upon the selected projection region 30a of the vehicle windscreen 24, and excites the transparent phosphors embedded in the vehicle windscreen 24 to produce an image visible to the occupant of the vehicle 12. After block 112, the method 100 proceeds to block 116.

At block 116, the controller 14 determines whether projection is complete. In some examples, it is advantageous to display a large image across the entire vehicle windscreen 24. By sequentially selecting and projecting upon each of the plurality of projection regions 30 at a high frequency, persistence of vision may allow the occupant of the vehicle 12 to perceive an image occupying the entirety of the vehicle windscreen 24. Therefore, at block 116, if an additional one of the plurality of projection regions 30 has not yet been illuminated, the method 100 returns to block 104 to select another projection region. If all of the plurality of projection regions 30 have been illuminated and projection is complete, the method 100 proceeds to enter a standby state at block 118.

In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds.

The system 10 and method 100 of the present disclosure offer several advantages. By directing the projected image using the projection directing module 28, a high-intensity, narrow-throw DLP projector may be used as the vehicle TWD projector 26, resulting in increased energy transfer to the transparent phosphors and thus brighter phosphorescence. Furthermore, by directing the projected image using the projection directing module 28, the entirety of the vehicle windscreen 24 may be illuminated with high-intensity projections. Additionally, use of the system 10 with the LCL 32 and the SLM 36 allows for redirection of the projected image at high frequency using electronic control.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for directing projections within a vehicle, the system comprising:
   a digital light processing (DLP) projector for producing a projected image;
   a projection directing module in optical communication with the DLP projector for directing the projected image to a predetermined location, wherein the projection directing module further includes a liquid crystal lens (LCL) in optical communication with the DLP projector, and wherein the projection directing module further includes a spatial light modulator (SLM) in optical communication with the LCL;
   a projection surface upon which the projected image is projected; and
   a controller in electrical communication with the DLP projector, the LCL, and the SLM, wherein the controller is programmed to:
   configure the projection directing module to direct the projected image to a projection region of the projection surface at least by applying a grating to the SLM based at least in part on an angle between the SLM and the projection region and setting a focal length of the LCL based at least in part on a location of the projection region; and
   project the projected image on the projection region using the DLP projector and the projection directing module.

2. The system of claim 1, wherein to configure the projection directing module to direct the projected image, the controller is further programmed to:

set the focal length of the LCL based at least in part on the location of the projection region, wherein the focal length of the LCL is set using a first electrical signal from the controller; and apply the grating to the SLM based at least in part on the angle between the SLM and the projection region, wherein the grating is applied using a second electrical signal from the controller.

3. The system of claim 2, wherein to set the focal length of the LCL, the controller is further programmed to:

retrieve an LCL voltage level from an LCL lookup table based at least in part on the location of the projection region; and apply the LCL voltage level to the LCL to set the focal length of the LCL using the first electrical signal from the controller.

4. The system of claim 3, wherein the LCL lookup table includes a plurality of LCL voltage levels, and wherein each of the plurality of LCL voltage levels in the LCL lookup table corresponds to a distance between the LCL and the projection region.

5. The system of claim 2, wherein to apply the grating to the SLM, the controller is further programmed to:

retrieve the grating from a grating lookup table based at least in part on the location of the projection region; and apply the grating to the SLM using the second electrical signal from the controller.

6. The system of claim 5, wherein the grating lookup table includes a plurality of gratings, and wherein each of the plurality of gratings in the grating lookup table corresponds to the angle between the SLM and the projection region.

7. The system of claim 1, wherein the projection surface is a vehicle windscreen.

8. The system of claim 7, wherein the vehicle windscreen includes a plurality of projection regions, and wherein the controller is further programmed to:

configure the projection directing module to direct the projected image to each of the plurality of projection regions of the vehicle windscreen; and project one of a plurality of projected images on each of the plurality of projection regions using the DLP projector and the projection directing module.

9. The system of claim 1, wherein the projected image includes a primary instrument display to provide information to an occupant of the vehicle.

10. A method for directing projections within a vehicle, the method comprising:

configuring a projection directing module to direct a projected image to one of a plurality of projection regions on a vehicle windscreen, wherein the projection directing module includes a liquid crystal lens (LCL) and a spatial light modulator (SLM), wherein the SLM is in optical communication with the LCL and the vehicle windscreen, wherein the SLM is in electrical communication with a controller, and wherein configuring the projection directing module to direct the projected image includes applying a grating to the SLM based at least in part on an angle between the SLM and the one of the plurality of projection regions and setting a focal length of the LCL based at least in part on a location of the one of the plurality of projection regions; and projecting an image on the one of the plurality of projection regions using a digital light processing (DLP) projector and the projection directing module, wherein the DLP projector is in optical communication with the projection directing module.

11. The method of claim 10, wherein configuring the projection directing module to direct the projected image further comprises:

setting the focal length of the LCL based at least in part on the location of the one of the plurality of projection regions, wherein the focal length of the LCL is set using a first electrical signal from the controller; and applying the grating to the SLM based at least in part on the location of the one of the plurality of projection regions, wherein the grating is applied using a second electrical signal from the controller.

12. The method of claim 11, wherein setting the focal length of the LCL further comprises:

retrieving an LCL voltage level from an LCL lookup table based at least in part on the location of the one of the plurality of projection regions, wherein the LCL lookup table includes a plurality of LCL voltage levels, and wherein each of the plurality of LCL voltage levels in the LCL lookup table corresponds to a distance between the LCL and the one of the plurality of projection regions; and applying the LCL voltage level to the LCL to set the focal length of the LCL using the first electrical signal from the controller.

13. The method of claim 11, wherein applying the grating to the SLM further comprises:

retrieving the grating from a grating lookup table based at least in part on the location of the one of the plurality of projection regions, wherein the grating lookup table includes a plurality of gratings, and wherein each of the plurality of gratings in the grating lookup table corresponds to the angle between the SLM and the one of the plurality of projection regions; and applying the grating to the SLM using the second electrical signal from the controller.

14. The method of claim 10 further comprising:

configuring the projection directing module to direct the projected image to each of the plurality of projection regions of the vehicle windscreen; and projecting one of a plurality of images on each of the plurality of projection regions using the DLP projector and the projection directing module.

15. A system for directing projections within a vehicle, the system comprising:

a digital light processing (DLP) projector for producing a projected image;

a projection directing module in optical communication with the projector, wherein the projection directing module includes:

a liquid crystal lens (LCL) in optical communication with the DLP projector; and a spatial light modulator (SLM), wherein the SLM is in optical communication with the liquid crystal lens;

a projection surface upon which the projected image is projected; and a controller in electrical communication with the DLP projector and the LCL and SLM of the projection directing module, wherein the controller is programmed to:

determine a selected projection region of a plurality of projection regions of a vehicle windscreen;

set a focal length of the LCL based at least in part on a distance between the LCL and the selected projection region;

apply a grating to the SLM based at least in part on an angle between the SLM and the selected projection region; and project the projected image on the selected projection region using the projector and the projection directing module.

16. The system of claim 15, wherein the controller is further programmed to:
sequentially select each of the plurality of projection regions of the vehicle windscreen such that an occupant of the vehicle perceives an image occupying an entirety of the vehicle windscreen.

17. The system of claim 16, wherein the projected image includes a primary instrument display to provide information to the occupant of the vehicle.

18. The system of claim 6, wherein one or more of the plurality of gratings in the grating lookup table is a blazed grating.

19. The system of claim 7, wherein the vehicle windscreen further includes transparent phosphors which fluoresce in response to excitation energy provided by the DLP projector.

20. The system of claim 15, wherein the controller is further programmed to:
sequentially project each of a plurality of projected images on the selected projection region, wherein each of the plurality of projected images contains only one wavelength of light, such that an occupant of the vehicle perceives a full-color image in the selected projection region.

* * * * *